(No Model.)
T. SYKES.
LOOM TEMPLE.
No. 589,585.
Patented Sept. 7, 1897.
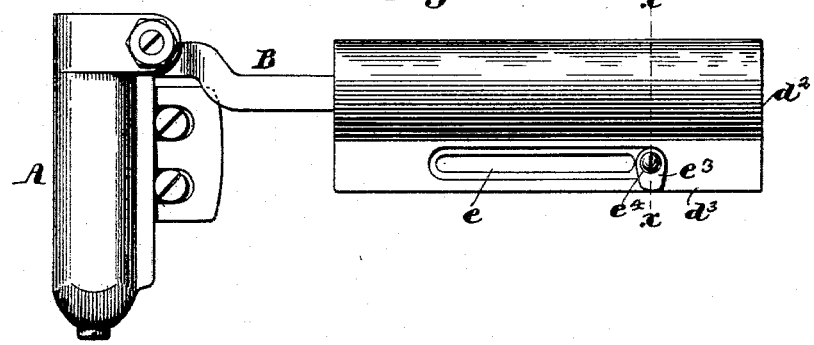
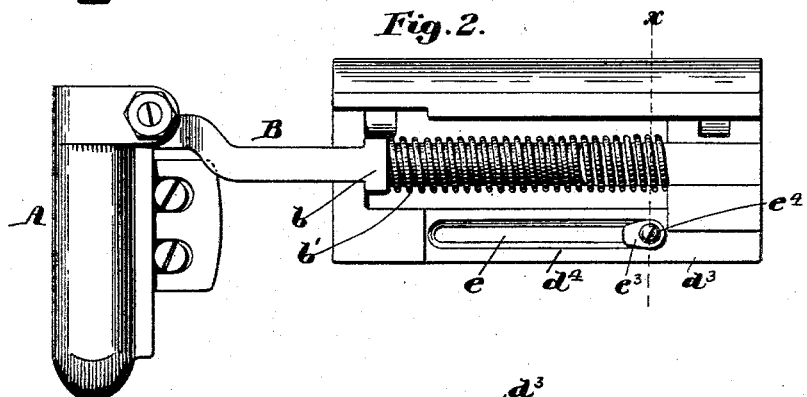
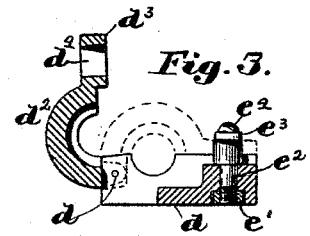
Witnesses:
Walter S. Lombard.
Thomas J. Drummond.
Inventor:
Thomas Sykes,
by Crosby & Gregory
Attys.
THE NORRIS PETERS CO., PHOTO-LITHO., WASHINGTON, D. C.

United States Patent Office.

THOMAS SYKES, OF PHILADELPHIA, PENNSYLVANIA, ASSIGNOR TO THE DRAPER COMPANY, OF PORTLAND, MAINE, AND HOPEDALE, MASSACHUSETTS.

LOOM-TEMPLE.

SPECIFICATION forming part of Letters Patent No. 589,585, dated September 7, 1897.

Application filed May 12, 1897. Serial No. 636,186. (No model.)

*To all whom it may concern:*

Be it known that I, THOMAS SYKES, of Philadelphia, (Frankford,) county of Philadelphia, State of Pennsylvania, have invented an Improvement in Loom-Temples, of which the following description, in connection with the accompanying drawings, is a specification, like letters on the drawings representing like parts.

In the use of loom-temples it is frequently desired for various purposes to take the sliding bar from the stand in which it slides, and to do this, as temples are now commonly made, the stand must be removed from the breast-beam. To obviate this, I have, as I believe, for the first time hinged or pivoted one part of the stand on another part thereof, so that by turning up and over one part the shank and its spring may be exposed to be readily removed.

Figure 1 represents a temple embodying my invention, but closed in working position. Fig. 2 shows the cap of the stand opened, and Fig. 3 by full lines shows the stand-cap open.

The temple-head A, it containing a toothed roller, (not shown,) and the shank B, having a shoulder $b$ and surrounded by a spiral spring $b'$, are and may be all as usual.

The stand is composed of a bottom plate $d$, to which is pivoted or hinged in suitable or any usual manner, as by pins $d'$, a cap $d^2$, the latter being so shaped as to overlap the spring $b'$ and leave along one edge of the cap a foot $d^3$, which is slotted for a part of its length at $d^4$, the said slot being shown as wider than the slot $e$ in the bottom plate $d$.

In one end of the slot $e$ I have secured by a nut $e'$ a stud $e^2$, it substantially filling the slot $d^4$, and in the upper end of this stud I have mounted a turn-button $e^3$, I using, as shown, for such purpose a stud-screw $e^4$. When this turn-button is in the position Fig. 1, the cap will be held closed, but when the turn-button occupies the position shown in Fig. 2 the cap may be raised and the bar and its spring may be removed.

The stand may be confined to the usual breast-beam by a bolt inserted through the slot $e$.

This invention is not limited to the particular shape of the turn-button or fastening device shown and described for locking the cap in its closed condition, and instead of it I may use any other suitable equivalent fastening device, for it will be obvious that the fastening device might be variously modified by only the skill of the mechanic and without invention and yet have a device within the scope of my invention.

Having described my invention, what I claim as new, and desire to secure by Letters Patent, is—

1. A temple-head, and its bar, combined with a stand composed of two parts, one of which is hinged on or with relation to the other part, and a fastening device to retain the said two parts locked together, substantially as described.

2. A loom-temple stand composed of a slotted bottom piece, and a hinged top cap, also slotted, combined with a fastening device coöperating with the slotted part of the cap to hold it closed or permit it to be opened, substantially as described.

In testimony whereof I have signed my name to this specification in the presence of two subscribing witnesses.

THOMAS SYKES.

Witnesses:
EDWIN STEARNE,
CHAS. H. PRAY.